Patented Aug. 2, 1949

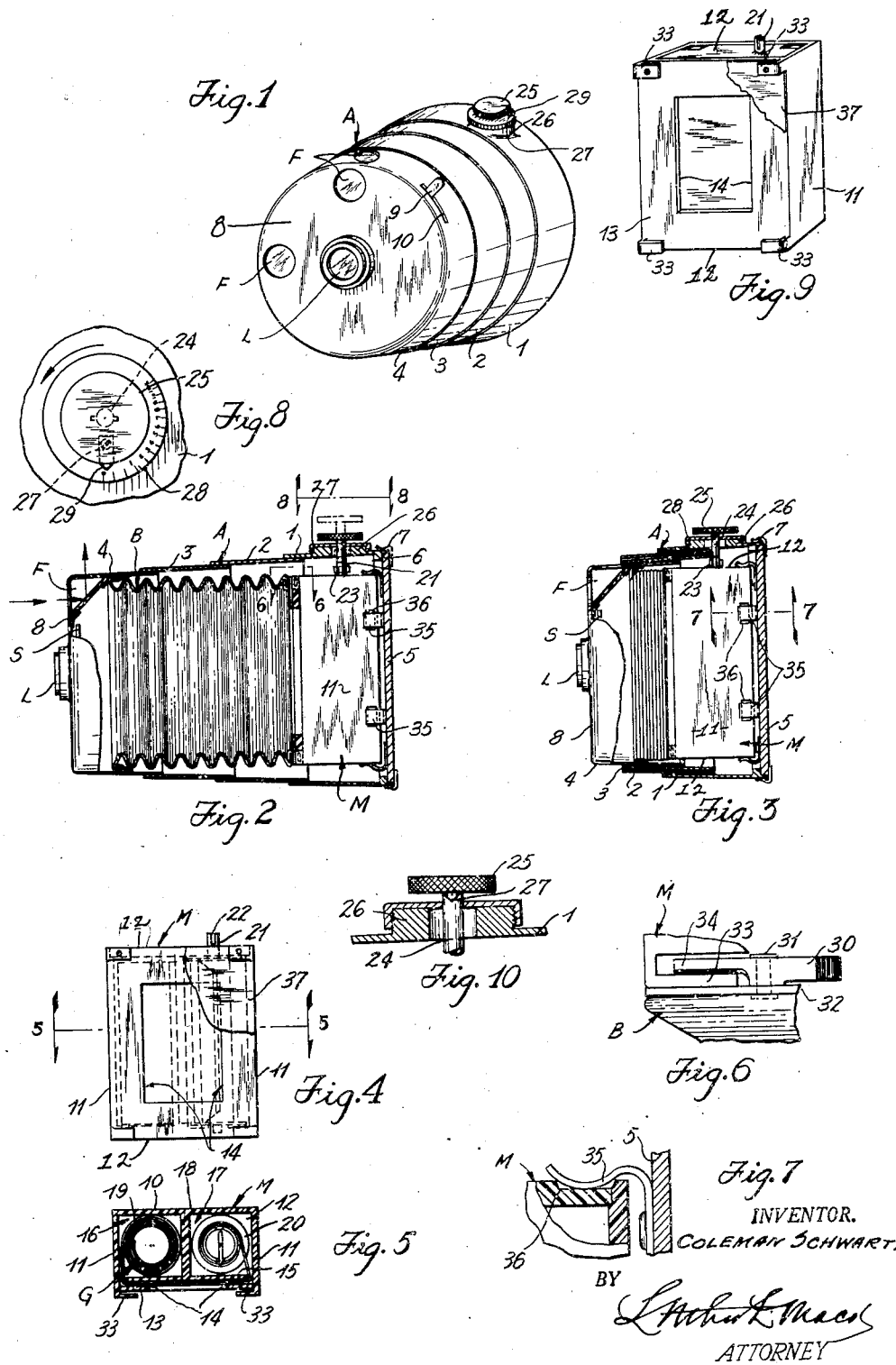

2,477,904

UNITED STATES PATENT OFFICE 2,477,904

DISPOSABLE ROLL FILM MAGAZINE FOR MINIATURE CAMERAS

Coleman Schwartz, Los Angeles, Calif.

Application May 14, 1945, Serial No. 593,667

3 Claims. (Cl. 95—34)

This invention relates in general to cameras for the production of still pictures, but more particularly to a pocket-size or miniature camera which is adapted to employ standard 18 or 35 millimeter film of sufficient length to provide ten or twelve exposable areas, more or less, and as a principal feature, include a magazine for the film in which strips of unexposed film are packed in light-proof condition, but which are of such character and material that the magazine may be discarded following the exposure of the films.

An object is to provide means for inserting and supporting a magazine containing a continuous film in position for movement so as to successively position unexposed areas of the film with respect to the lens, together with means exteriorly of the case and operatively connected with the film, for advancing the film in a step-by-step movement relative to the lens.

A primary object is to provide a special type of magazine, formed of paper, plastic or other cheap material, for enclosing and operatively supporting an unexposed strip of film which is insertible in the case into operative engagement with a film actuating means and in light-proof connection with a bellows, and which may be bodily removed while containing the exposed film, and upon removal of the film therefrom may be discarded.

Still other objects may appear as the description progresses.

I have shown one form of camera embodying my improvements in the accompanying drawing, although it will be readily understood that the structure and arrangement of parts, as well as the connections between the several elements of the camera, may be modified within the scope of the appended claims without departing from the spirit of the invention.

In the drawings:

Fig. 1 is a perspective view of a camera embodying my improvements; Fig. 2 is a longitudinal section with the case and bellows extended; Fig. 3 is a longitudinal section with the case and bellows either partially or completely collapsed; Fig. 4 is a front elevation of a loaded magazine; Fig. 5 is a sectional view of the same on line 5—5 of Fig. 4; Fig. 6 is a fragmentary section on line 6—6 of Fig. 2; Fig. 7 is a fragmentary section on line 7—7 of Fig. 3; Fig. 8 is a plan view of a scale for visibly indicating the extent of movement of the film for making successive exposures; Fig. 9 is a perspective view of a loaded magazine adapted for insertion in the camera; Fig. 10 is a fragmentary, sectional view of the film winding member and mounting therefor.

I provide a novel form of collapsible case generally represented at A, which is composed of a plurality of frustums, as at 1, 2, 3, and 4, of graduated diameters, preferably formed with the largest frustum at the rear and the smallest at the front of the case. The frustum sections are telescopic, so that when the case is extended, as in Fig. 1, the rear ends thereof will frictionally engage the forward portions of the next adjacent rear sections and thus limit the extent to which the case may be extended and at the same time close the interior of the case to the entrance of light. The sections 1, 2, 3, and 4 are approximately of equal length, in order that when they are collapsed they occupy, as nearly as possible, the space of, and be nested in the rear member 1.

The member 1 is open at its rear end so that a magazine M may be inserted in and removed from the case at will, and has a detachable closure plate adapted to abut an inturned flange 6. Said plate 5 may be held in position on member 1 as by means of one or more clips 7, fixed either to the cover or case, and frictionally engaging the other member.

Member 4 has a front wall 8, in the center of which a lens L is mounted, and also carries one or more finders F, as well as a suitable shutter S having an operating finger 9 extended through a slot 10.

Member 4 also supports the front end of a bellows B in fixed position, so that when the rear end of the bellows is attached to the front side of magazine M the bellows will expand and contract as the case A is extended and collapsed. Said bellows is, as usual, light-proof and serves to keep the film unexposed when the case A is collapsed.

Magazine M is preferably formed of thin but reasonably stiff cardboard, or other inexpensive material, and has a back 10, sides 11, 11, ends as at 12, a front 13 formed with an aperture 14 therein, a false front wall 15 extended behind said aperture but spaced at opposite extremities from the sides 11, 11, as shown in Fig. 5. The interior of the magazine is formed with two compartments 16 and 17, which are separated by a transverse wall 18 wherein a strip of unexposed film G may be supported for movement over the front surface of wall 15.

A strip of film G is rolled as at 19 into a plurality of convolutions and is loosely held in compartment 16 with its outer end provided with a leader portion of sufficient length and extended over the face of wall 15, and thence into compartment 17 where it is attached to a take-up spool 20. The film is unwound from roll 19, therefore, and is wound on spool 20 in a step-by-step movement, as successive unexposed areas of the film are moved to and from position before the aperture 14 in photographic operations. Spool 20 has a diametrically slotted extension 21 (with a slot 22 therein), which is adapted to connect with a tongue 23 of a stem 24 depending into the magazine compartment of the case and adapted to be manually rotated as by means of a knurled finger piece 25 fixed to the stem externally of member 1 (see Figs. 2 and 3).

Member 1 has a boss 26 on its external periphery through which stem 24 is extended and over which member 25 is rotatable, and an indicator 27 is fixed to either stem 24 or member 25 for movement relative to a graduated scale 28 (Fig. 8) by means of which successive exposable areas of film G are visibly indicated as they are moved into position before aperture 14 of the magazine.

Scale 28 may be graduated from a point of beginning and progressing to the right, as shown in Fig. 8. Each space between adjacent graduations represents the extent to which member 25 must be turned beyond one complete revolution of spool 20. Inasmuch as film G has a leader portion of three or more picture areas for the purpose of insuring the following sensitized areas against the entrance of light, member 25 must first be turned as many full revolutions as there are spaces between "0" and "1" on the dial 28, at which time the first exposable area on the film will be positioned in registration with aperture 14 of the magazine and the pointer 29 will register with the numeral "1" on the dial.

Each time a new area is moved into position in registration with aperture 14 the member 25 is rotated for one complete revolution, plus the distance between the numbered graduations on the dial. For instance, from "1" to "2," etc. The graduations on the dial are so spaced as to correspond to and to conform to the variations in length of the different convolutions of film as the film is wound on spool 20.

The film is prewound to form the rolls 19, and is, therefore, so tensioned as to hold the flat sections thereof in front of wall 15 tensioned. Stem 24 and its head 25 are axially movable, as shown in Fig. 2 for detaching the stem from spool 20 so that the magazine may be removed and a new one inserted in the case.

As shown in Figs. 5 and 6, the bellows B and the magazine M are detachably connected as by means of clamps 30 which are pivoted at 31 to a rigid frame 32 at the rear end of the bellows, the front of the magazine having inwardly turned flanges 33, between which and the front wall 13 portions 34 of the clamps are confined. The magazine is attached to the bellows while the case and the bellows are collapsed and, as shown in Figs. 2, 3 and 7, the back 5 may be attached to the magazine as by means of spring clips 35 having portions adapted to frictionally seat in depressions 36 formed externally on the walls of the magazine.

When the magazines are loaded with film as shown in Fig. 5, strips of opaque paper, or other material 37 are affixed to the front wall 13 of the magazines for closing the aperture to the entrance of light to film G. When a magazine is placed in the camera the paper closure is, of course, torn away.

It is apparent that the magazines are assembled with the film G operatively attached to spool 20 for insertion into the case while the back 5 is removed. The front end of the magazine is attached to bellows B, and the slotted extension 21 of spool 20 is attached to stem 24 of the film actuator 25, after which the back is affixed, the case A is extended as shown in Figs. 1 and 2, and following the movement of film G initially to an extent necessary to position the first unexposed portion of the film before the aperture 14 the shutter S is actuated by member 9 and the first picture is taken. Therefore, succeeding exposures of the film are effected after first having advanced the film to a necessary extent by rotation of member 25 and spool 20, in succession. The dial 28 will always indicate, together with member 25, the number of pictures previously taken, and, following the final exposure, the magazine may be removed with the exposed film intact, sealed and the film developed.

A new magazine is readily substituted for a used one with facility and reasonable care.

One or more of the finders F may be provided for properly positioning the camera relative to a subject. Also, a suitable case for enclosing and holding the camera in collapsed condition, or other means for such purpose, may be provided, but such means are not necessarily a material characteristic of my invention.

It will be apparent that the bellows of the camera may be extended outwardly from the case, as when making negatives, and by suitable means folded back into the camera when the case is closed; also, the magazine casing may be made of any other shape, than shown, and adapted for various sized film rolls.

Certain of the advantages of my invention will be seen from a reading of the foregoing portion of the description. Other advantages arise from the provision of a camera having a bellows element, the rearward end of which is effective to be extended outwardly and rearwardly of the case to be conveniently accessible for easy attachment to the rear end of the bellows, a film magazine which is thereafter to be operatively mounted in the case. Other advantages arise from the provision of a camera having a film advancing means, a plurality of telescoping elements, to the forward end of which is fastened a bellows element, the rear end of which bellows may be left free while the camera is not in use. A further advantage is the provision of a rearmost case-like telescopic element having means cooperating with said film advancing means by which the next rearmost of the telescoping elements may be fully disposed in the case so that for convenience in transportation the other telescoping elements may be compactly disposed inside the case around the bellows after the film magazine has been disconnected from the bellows and disposed of separately from the case.

I claim:

1. A disposable roll film container for cameras having an open back and a light tight removable back cover therefor, comprising a box-like body closed on all sides but one; a wall dividing said box into two compartments one of which is adapted to receive a roll of unexposed film; a spool arranged in the other compartment upon which exposed film is wound, said spool being formed to engage with film winding means extending through a wall of the camera, an opening in one wall of the container through which the light passed by the camera shutter falls upon the film, a false front wall extending behind said opening and spaced at opposite sides from the side walls of the container, the unexposed film being threaded through the space between the walls of the container and over the front of the false wall before the container is completely closed; and resilient container positioning means mounted on the inside of the back cover into which said container holding unexposed film may be inserted before the back cover is positioned on the back of the camera and from which the film container with exposed film therein may be removed after the back cover is opened.

2. A disposable roll film container as set forth in claim 1 and in addition comprising a removable layer of opaque material secured over the opening in the wall of the container but removed before the container is put in service.

3. A disposable roll film container as set forth in claim 1 and in which said resilient means for positioning the container on the inside of the cover comprise spring clips mounted on the cover and engaging in recesses formed in the wall of the container and effective to accurately hold the container in the focal plane of the camera.

COLEMAN SCHWARTZ.

REFERENCES CITED

The following references are of record in the file of this patent:

UNITED STATES PATENTS

| Number | Name | Date |
| --- | --- | --- |
| 446,372 | Whitney | Feb. 10, 1891 |
| 524,142 | Hegelein | Aug. 7, 1894 |
| 542,334 | Esmond | July 9, 1895 |
| 595,468 | Cook | Dec. 14, 1897 |
| 771,607 | Burns | Oct. 4, 1904 |
| 949,450 | Scotchmer | Feb. 15, 1910 |
| 1,936,860 | Ruberg | Nov. 28, 1933 |
| 2,093,480 | Platt | Sept. 21, 1937 |
| 2,143,385 | Platt | Jan. 10, 1939 |
| 2,187,449 | French | Jan. 16, 1940 |
| 2,208,797 | Kende | July 23, 1940 |